INVENTOR.
EDWARD F. HOLLANDER, JR.
BY
ATTORNEY

United States Patent Office 3,341,722
Patented Sept. 12, 1967

3,341,722
TEMPERATURE COMPENSATED ELECTRICAL DEVICE
Edward F. Hollander, Jr., Broomall, Pa., assignor to Litton Precision Products Inc., Clifton Heights, Pa., a corporation of Delaware
Filed Aug. 4, 1964, Ser. No. 387,338
4 Claims. (Cl. 310—64)

This invention relates to temperature compensated electrical devices and more particularly concerns tachometers, synchro and servo motors, and the like, which must operate under extreme conditions of hot and cold temperatures.

Electrical devices, such as tachometers, synchros, and servo motors, must be operable in a temperature range of −55° C. to +125° C. However, temperature variation causes changes in electrical characteristics. To compensate for these changes, thermistors have been used. With a thermistor in the electrical circuit, as the temperature rises and the impedance of some of the elements increases because of the heat, the impedance of the thermistor decreases so as to balance the increased electrical impedance and maintain the electrical characteristics of the device. However, when the heat passes through about 165° C. to 175° C., the thermistor fails and is no longer useful.

In conventional devices, the thermistor is placed at the hot spot within the electrical device, and if the ambient temperature around the device is around 125° C., the thermistor may very well be at 165° C. to 175° C.

Accordingly, one of the limiting factors in the operation of such devices has been the fact that one or more of its elements would fail at high temperatures. The thermistor might fail, or the lubricant in the bearings may evaporate, or other elements of the device may be affected, such as the impregnant material, the cement holding the laminations of the rotor or stator together, or the insulation of the magnet wire forming the rotor or stator coils.

Accordingly, it is an object of this invention to overcome the aforementioned problems caused by high temperatures, and provide an electrical device which operates satisfactorily at high temperatures.

It is another object to avoid a temperature gradient along the housing of an electrical device and thereby avoid uneven stresses in the housing, and the component generally, which would be caused by such a temperature gradient.

It is another object to remove a portion of the heat energy from the interior of a housing of an electrical device, and thereby lower the temperature within the device.

Other objects and advantages of this invention, including its simplicity and economy, as well as the ease with which it may be adapted to existing equipment, will further become apparent hereinafter and in the drawings, in which.

Figure 1:
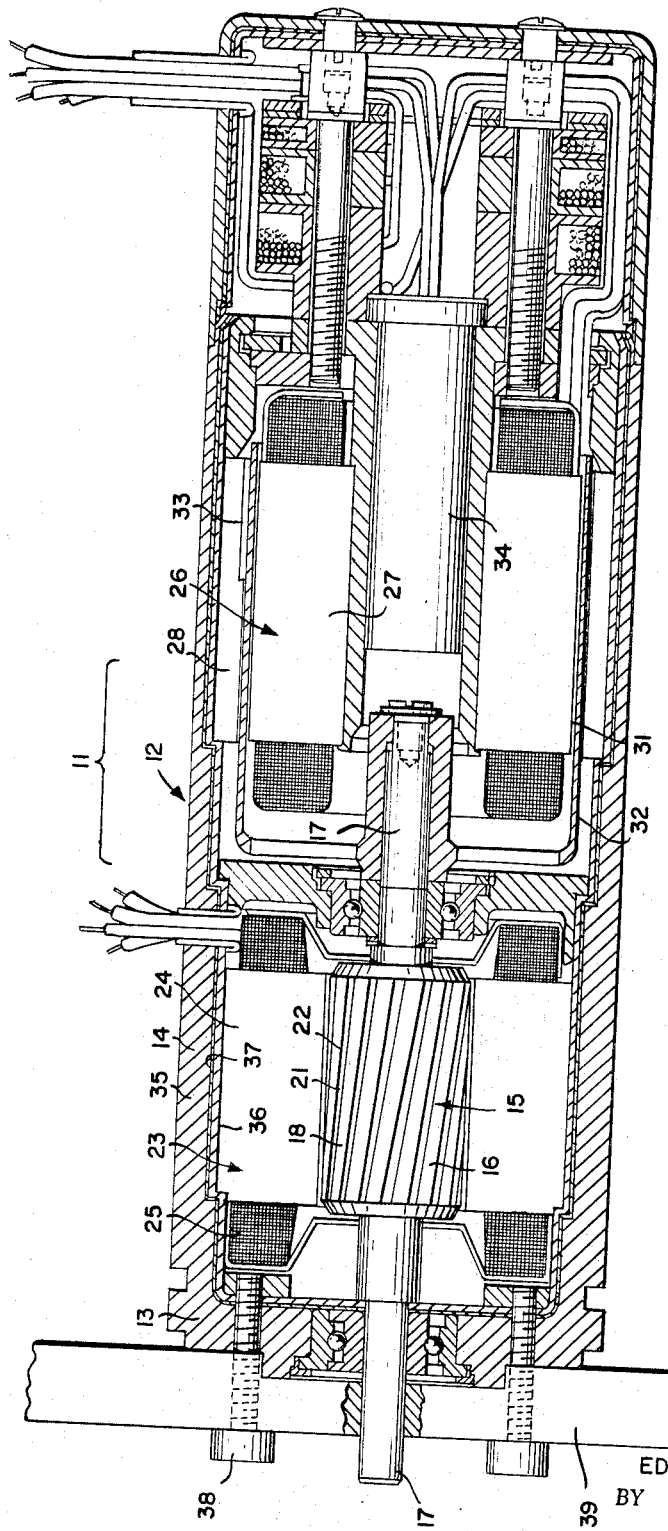
FIG. 1 is a view in section of a motor tachometer constructed in accordance with this invention.

Although specific terms are used in the following description for clarity, these terms are intended to refer only to the structure shown in the drawings, and are not intended to define or limit the scope of the invention.

Turning now to the specific embodiments of the invention selected for illustration in the drawings, there is shown in FIG. 1 a temperature compensated motor-tachometer 11 which comprises a cup-shaped housing 12 having a base wall 13 and a cylindrical side wall 14. A rotor 15 is positioned in housing 12 and includes a stack 16 of rotor laminations mounted on a rotor shaft 17. Stack 16 has teeth 18 on its outer periphery with slots 21 therebetween, and a winding 22 is positioned in slots 21.

A stator 23 is positioned about rotor 15 and includes a stack 24 of annular laminations fixedly mounted in housing 12. Stator stack 24 is provided on its inner periphery with teeth which have slots therebetween, and a winding 25 is positioned in the stator slots.

A tachometer stator 26 is fixedly positioned in housing 12 and includes a stack 27 of annular laminations having teeth on its outer periphery. A primary winding is positioned in the slots of tachometer stator 26, and a secondary winding is also positioned therein but in quadrature electrical spacing with the primary winding.

A flux return path member 28 is positioned about tachometer stator 26 and includes a stack of annular laminations. An air gap 31 is provided between the flux return path member 28 and tachometer stator 26, and a rotatable drag cup 32 is mounted on rotor shaft 17 and positioned in the air gap 31. The drag cup 21 couples together the windings of tachometer stator 26 when the drag cup is rotating.

A discontinuity groove 33 is formed in flux return path member 28, and a thermistor 34 is positioned inside tachometer stator 26. Thermistor 34 is adapted to lower its electrical impedance as the temperature within housing 12 increases so as to maintain the electrical characteristics of the motor-tachometer and balance the increase in electrical impedance in other components in the motor-tachometer caused by the increased heat.

Housing 12 has a casing 35 made of non-magnetic stainless steel, a layer 36 of copper 10 mils thick forming the inside of the housing, and a flash layer 37 of nickel 10 to 30 millionths of an inch thick connecting copper layer 36 to the stainless steel casing 35, thereby providing for good adhesion and preventing electrolytic action between the copper of layer 36 and the steel of casing 35.

Thermally conductive mounting screws 38, which may be made of brass, are mounted on base wall 13 of housing 12 and extend from outside the housing to contact copper layer 36.

Copper layer 36 conducts the heat away from the hot spot at thermistor 34 and spreads it more evenly throughout the interior of housing 12. Screws 38 serve to conduct the heat from inside housing 12 to the outside to thereby lower the inside temperature.

Housing 12 is shown mounted on a support or mounting section 39.

Figure 2:
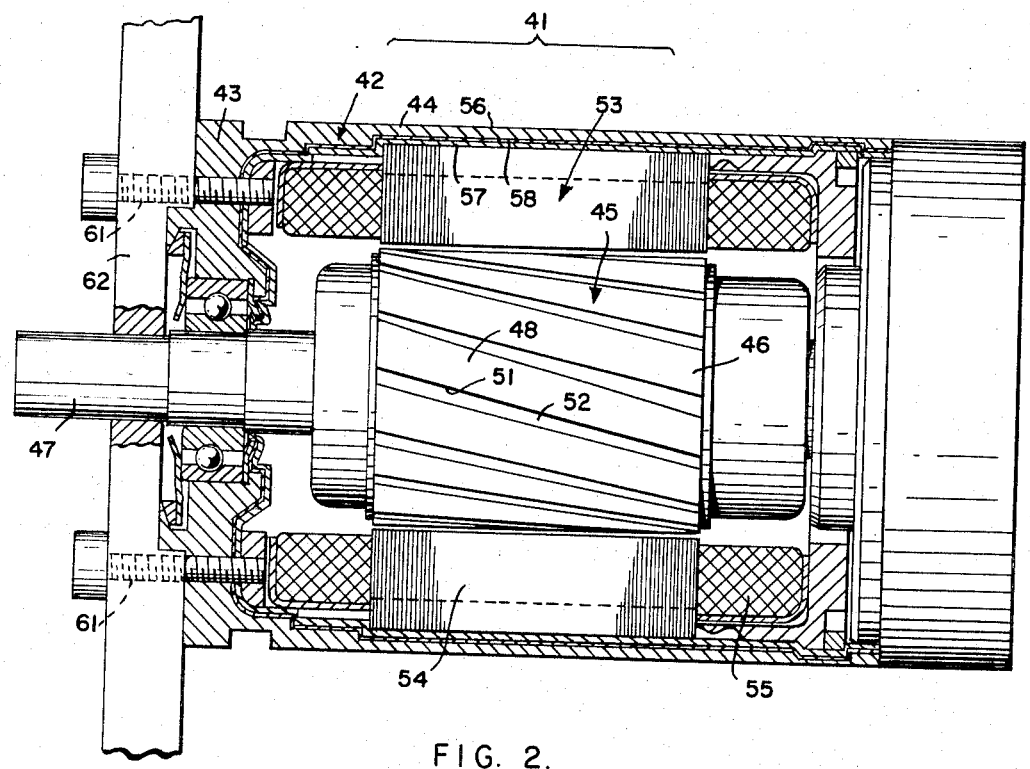
FIG. 2 is a view in section of a synchro motor constructed in accordance with this invention.

Turning now to the embodiment of the invention shown in FIG. 2, there is shown a synchro motor 41 which comprises a cup-shaped housing 42 which has a base wall 43 and a cylindrical side wall 44. A rotor 45 is positioned in housing 42 and includes a stack 46 of laminations mounted on a rotor shaft 47. Stack 46 has teeth 48 on its outer periphery with slots 51 therebetween, and a winding 52 is positioned in slots 51.

A stator 53 is positioned about rotor 45 and includes a stack 54 of annular laminations fixedly mounted in housing 42. Stator stack 54 is provided with teeth on its inner periphery with slots therebetween, and a winding 55 is positioned in the stator slots.

Housing 42 includes a casing 56, which may be made of non-magnetic stainless steel, a layer of copper 10 mils thick forming the inside of housing 42, and, optionally, a layer 58 of nickel connecting copper layer 57 to the stainless steel casing 56. Nickel layer 58 is a flash layer of about 10 to 30 millionths of an inch in thickness which provides for good adhesion between the copper of layer 57 and the steel of casing 56, and prevents electrolytic action between the copper and the steel.

Thermally conductive screws 61 are mounted on base wall 43 of housing 42 and extend from the outside of the housing to contact the upper layer 57. Screws 61 and copper layer 57 act to conduct heat from inside the housing 42 to the outside and thereby lower the inside temperature.

Housing 42 is mounted on support or mounting section 62 by means of the screws 61.

Figure 3:
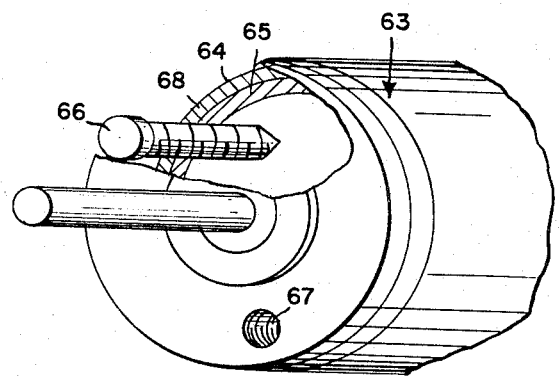
FIG. 3 is a view in perspective, with parts cut away, of another electrical device constructed in accordance with this invention.

Turning now to FIG. 3, there is shown a temperature compensated housing 63 for an electrical device having a hot spot. The housing 63 comprises a casing 64 which is made of a corrosion-resisting metal, such as non-magnetic stainless steel which is a poor conductor of heat. A layer 65 of heat conductive metal, such as copper, forms the inside of housing 63 for conducting the heat from the hot spot to spread the heat more uniformly within housing 63 to thereby lower the emperature of the hot spot.

Thermally conductive screws 66, which may be made of brass, are screwed into the tapped holes 67 to contact heat conductive layer 65. Screws 66 extend to the outside of housing 63 and transfer heat from layer 65 to the outside of housing 63 to thereby lower the temperature of layer 65 and the temperature within the housing 63. Screws 66 are also adapted for mounting the housing 63 onto a support.

For better adhesion to the stainless steel of casing 64, and to prevent electrolytic action between the copper of layer 65 and the steel of casing 64, a flash layer 68 of nickel is plated onto the interior of casing 64. Thereafter, copper layer 65 is plated onto layer 68 and is slowly built up to a thickness of 15 to 18 mils. Then the thickness of layer 65 is machined down to about 10 mils.

The thickness of heat conductive layer 65 may vary in accordance with the amount of heat which must be conducted away from the hot spot and dissipated. Accordingly, the thickness of layer 65 varies with the power put into the electrical device.

In practice, hot spots in the range of 90° C. to 105° C. were lowered by 15 degrees to about 80° C. or 90° C. by means of the copper layer which forms a lining of the bore of the housing. This 80° C. to 90° C. heat was further cut to about 40° C. by means of the heat conductive screws which contact the copper lining and conduct a portion of the heat to the outside of the housing.

It is to be understood that the forms of the invention herewith shown and described are to be taken as presently preferred embodiments. Various changes may be made in the shape, size and arrangements of parts, and equivalent elements may be substituted for those illustrated and described herein. For example, other highly heat conductive metals such as silver and gold could be used for the copper of the heat conductive layer. Moreover, parts may be reversed, and certain features of the invention may be utilized independently of the use of other features, all without departing from the spirit or scope of the invention as defined in the subjoined claims.

The claimed invention:

1. A temperature compensated motor-tachometer comprising a cup-shaped housing having a base wall and a cylindrical side wall, a rotor positioned in said housing including a stack of laminations mounted on a rotor shaft, said rotor stack having teeth on its outer periphery with slots therebetween, a winding positioned in said stator slots, a tachometer stator fixedly positioned in said housing and having a stack of annular laminations, said tachometer stator stack having teeth on its outer periphery, a primary winding positioned in the slots of the tachometer stator, a secondary winding positioned in the slots of the tachometer stator in quadrature electrical spacing with the primary winding, a flux return patch member positioned about the tachometer stator and having a stack of annular laminations with an air gap between the flux return path member and the tachometer stator, a rotatable drag cup mounted on said motor shaft and positioned in said air gap about said tachometer stator, said drag cup coupling together the tachometer stator windings when it is rotating, a discontinuity groove formed in the flux return path member, a thermistor positioned inside said tachometer adapted to lower its electrical impedance as the temperature within said housing increases so as to maintain the electrical characteristics of the motor-tachometer and balance the increase in electrical impedance in other components in the motor-tachometer caused by increased heat, said housing having a casing being made of stainless steel, a layer of copper 10 mils thick forming the inside of the housing, a layer of nickel connecting the copper layer to the stainless steel casing for good adhesion and for preventing electrolytic action between the copper and the steel, and thermally conductive screws mounted in the base wall of said housing and extending from the outside of the housing to contact said copper layer, said copper layer and said screws acting to conduct heat from inside the housing to the outside to thereby lower the inside temperature.

2. A motor comprising a cup-shaped housing having a base wall and a cylindrical side wall, a rotor positioned in said housing including a stack of laminations mounted on a rotor shaft, said rotor stack having teeth on its outer periphery with slots therebetween, a winding positioned in said rotor slots, a stator positioned about said rotor including a stack of annular laminations fixedly mounted in said housing, said stator stack having teeth on its inner periphery with slots therebetween, a winding positioned in said stator slots, said housing having a casing being made of stainless steel, a layer of copper 10 mils thick forming the inside of the housing, a layer of nickel connecting the copper layer to the stainless steel casing for good adhesion and for preventing electrolytic action between the copper and the steel, and thermally conductive screws mounted in the base wall of said housing and extending from the outside of the housing to contact said copper layer, said copper layer and said screws acting to conduct heat from inside the housing to the outside to thereby lower the inside temperature.

3. A temperature compensated housing for an electrical device having a hot spot comprising a casing made of corrosion-resistant metal which is a poor conductor of heat, a layer of heat conductive metal forming the inside of said housing for conducting the heat from said hot spot to spread the heat more uniformly within the housing and thereby lower the temperature of the hot spot, and thermally conductive screws in contact with said heat conductive layer and extending to the outside of said housing for transferring heat from said layer to the outside of said housing to thereby lower the temperature of said layer and the temperature within the housing.

4. The temperature compensated housing defined in claim 3, wherein said screws are also adapted for mounting the housing onto a support.

References Cited

UNITED STATES PATENTS 2,824,983  2/1958  Cametti et al. _____ 310—64

FOREIGN PATENTS 869,241  3/1953  Germany.

MILTON O. HIRSHFIELD, *Primary Examiner.*

D. X. SLINEY, *Assistant Examiner.*